(No Model.) 2 Sheets—Sheet 1.

R. C. MENZIES.
MACHINE FOR DEFIBERIZING COMPACTED JUTE.

No. 578,890. Patented Mar. 16, 1897.

Witnesses:
J. E. Marble
E. Savage

Inventor:
Robert C. Menzies,
by William K. Low.
Attorney.

(No Model.) 2 Sheets—Sheet 2.

R. C. MENZIES.
MACHINE FOR DEFIBERIZING COMPACTED JUTE.

No. 578,890. Patented Mar. 16, 1897.

Witnesses:
J. E. Marble
E. Savage

Inventor:
Robert C. Menzies,
by William W. Low.
Attorney.

UNITED STATES PATENT OFFICE.

ROBERT C. MENZIES, OF GLENS FALLS, NEW YORK.

MACHINE FOR DEFIBERIZING COMPACTED JUTE.

SPECIFICATION forming part of Letters Patent No. 578,890, dated March 16, 1897.

Application filed September 12, 1894. Serial No. 522,798. (No model.)

*To all whom it may concern:*

Be it known that I, ROBERT C. MENZIES, of Glens Falls, in the county of Warren and State of New York, have invented new and useful Improvements in Machines for Defiberizing Compacted Jute, of which the following is a specification.

My invention relates to a machine for loosening the fibers of jute that has been compressed in the process of baling for transportation, the jute being often reduced to such a compact mass that the fibers can only be separated by machinery of exceeding strength and power.
The object of my invention is to provide facilities for mechanically separating the fibers of the compacted jute without injury to them. This object I attain by the mechanism illustrated in the accompanying drawings, which are herein referred to and form part of this specification, and in which—

Figure 1:
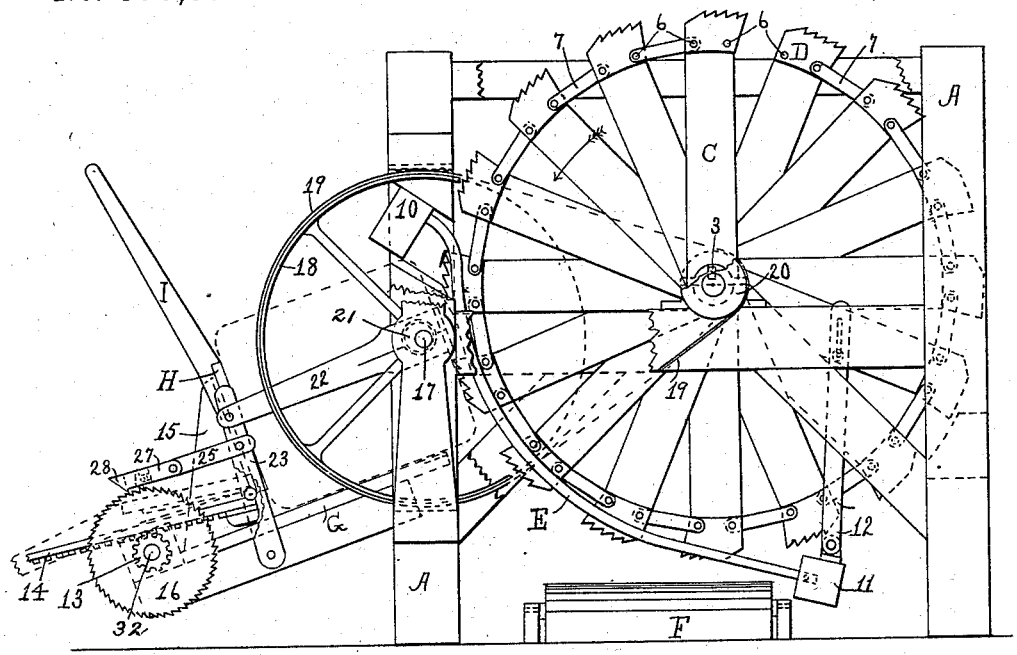
Figure 3:
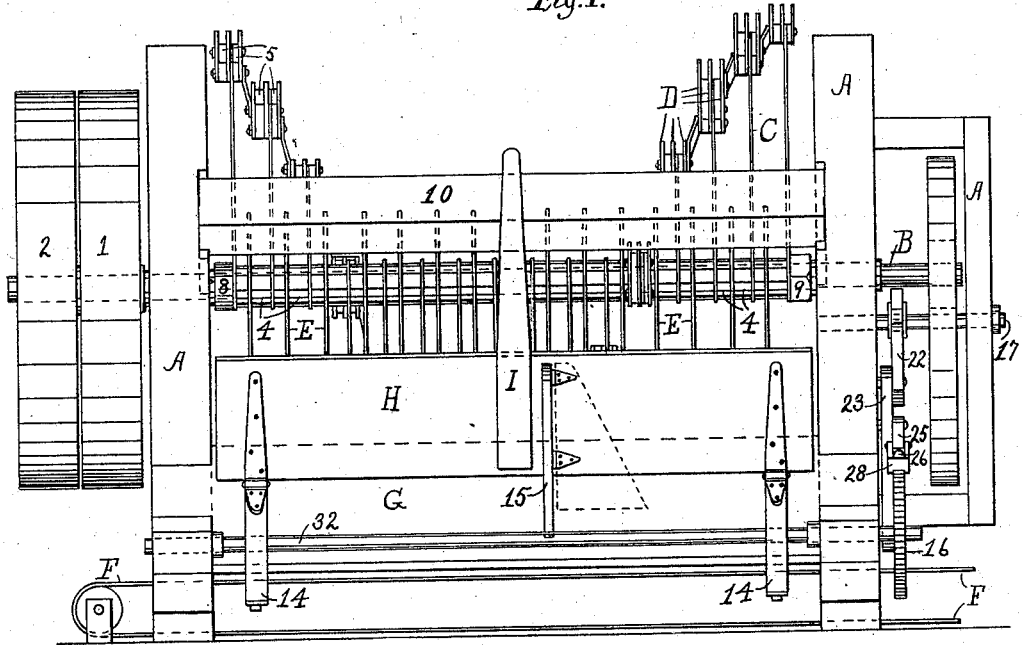
Figure 2:
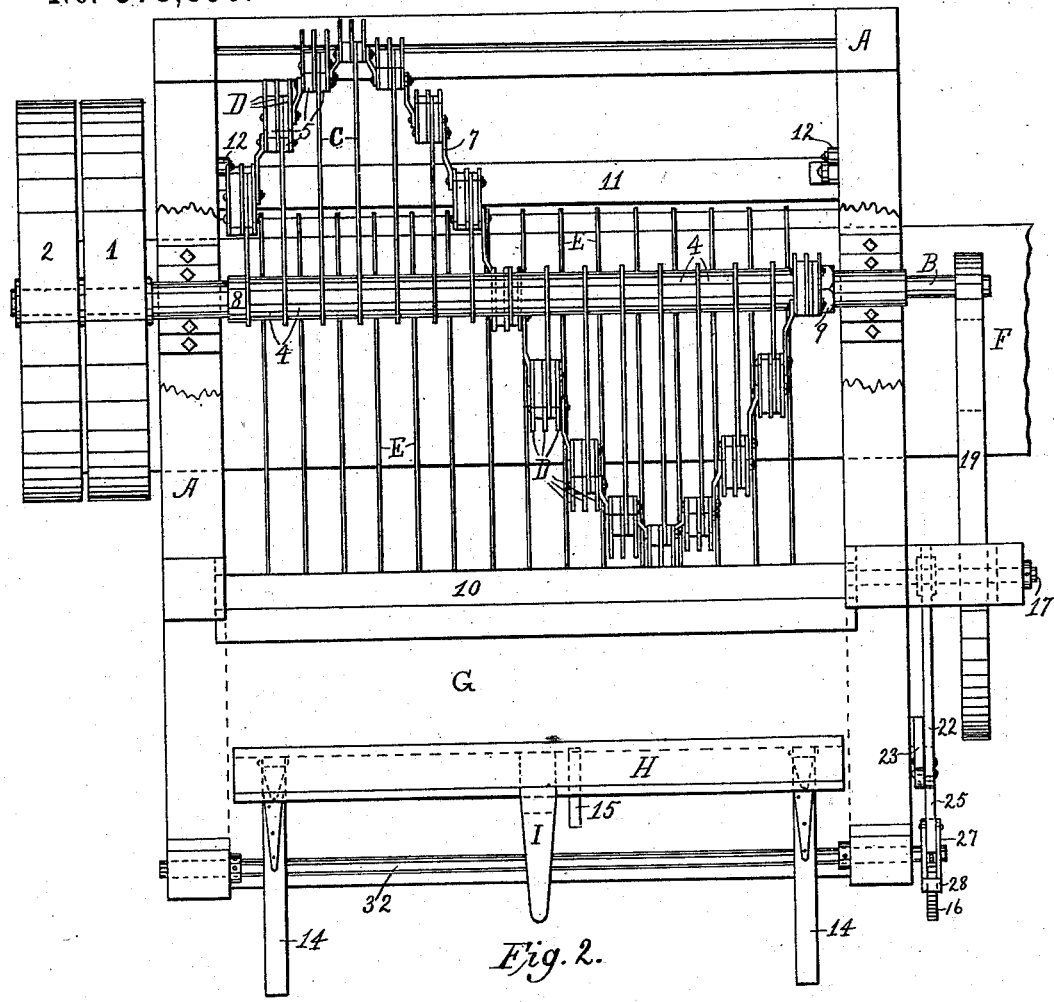
Figure 4:
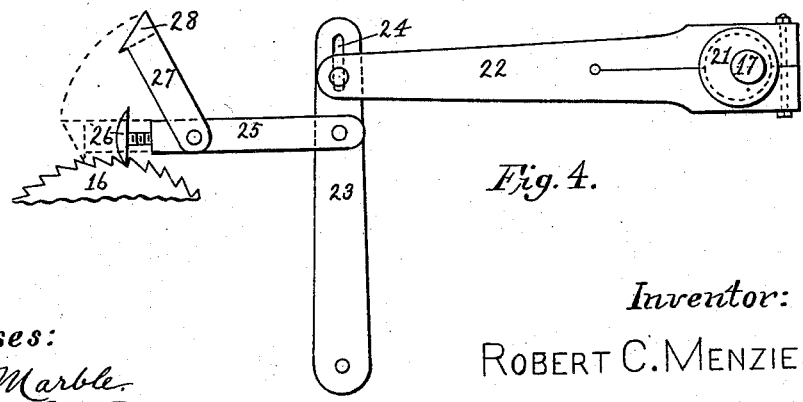

Figure 1 is a side elevation of a machine which embodies my invention, parts of said machine being broken out to show underlying parts; Fig. 2, a plan view; Fig. 3, a front elevation, and Fig. 4 an enlarged and detached detail of the adjustable feed mechanism.

As represented in the drawings, A designates the framework of the machine, which may be of the form shown or any other suitable form, and it may be composed of wood or metal, as may be preferred.

B is a shaft journaled on the framework and provided with a tight pulley 1 and a loose pulley 2, to which motion is imparted by means of a driving-belt (not shown in the drawings) from any suitable motive power. Said shaft is provided with a longitudinal spline or feather 3 for a purpose that will be shortly described. A series of arms C are arranged on the shaft B radially from the latter and spaced equidistantly, so that the entire series will form a helix around the shaft B, said arms being spaced equidistantly on the length of the shaft, preferably by means of a series of sleeves 4, which slip on the shaft B. The several arms C are positioned on the shaft B to stand at a required angle to the lines of the other arms of the series by means of a keyseat cut in each arm and fitted to slide on the spline 3. The outer end of each arm is provided with a series of three or more segmental plates D, and the outer edge of each of said plates is provided with a series of teeth or serrations whose angled sides will be arranged toward the advancing edge of the arm to which it is attached, as shown in Fig. 1, in which the direction of movement is indicated by an arrow, and preferably the first tooth on each segment-plate is larger than the others, so as to present a longer bevel when the segment-plates strike the bale of jute, (the latter being indicated by dotted lines in Fig. 1,) and thereby the jute will be broken from the bale instead of being torn therefrom, as would be the case if the position of the teeth were reversed to bring them into the position of the teeth of a circular saw. The series of segmental plates are spaced equidistantly in the direction of the length of the shaft by means of spacing-blocks 5, and the spaces between the successive arms C are arranged so that the space between the outer plate of one arm in respect to the nearest plate on the next succeeding arm will have the same distance from the face of the outer plate of the next arm as is given between the plates of each series of segmental plates, that is to say, if the series of arms be considered as a revolving drum with series of segmental plates spaced along the direction of its length the several series of segmental plates will be spaced at equal distances over the entire length of the imaginary drum, so that the paths of the several segmental plates will be equidistantly spaced on the length of said drum.

The segmental plates D and spacing-blocks 5 are secured to the respective arms C by means of bolts 6, which also secure the ends of links 7, which connect the outer end of each arm to the next succeeding arm, excepting there is no link between the first and last arm, and the two arms last referred to are not connected together like the others for the reason that for that purpose a link would be required to extend nearly across the entire length of the machine, and while such a link would not add materially in supporting the two outer arms against a strain thrown upon them in the operation of the machine it would be adding a useless weight to be carried by the shaft B without adding to the effectiveness of the machine. By this system of links the several connected arms support each other through the entire series. The arms C and sleeves 4, when fixed in position on the shaft B, are clamped between a collar 8 and a screw-nut 9, for which a screw-thread is formed on one part of the shaft B.

E designates ribs or clearers for removing the jute from the teeth of the segmental plates D, and for that purpose one of said clearers will suffice for each series of segmental plates. The outer end of each of said clearers is attached to a cross-bar 10, which is made adjustable, in respect to the center of the shaft B, in the framework A, and for that purpose the ends of the cross-bar 10 enter angular grooves formed in the front posts of the framework A, as shown in Figs. 1 and 3, and said cross-bar is secured in place by driving wedges or keys between it and the shoulders of said grooves, as shown in Fig. 3. To adjust the cross-bar 10, said keys should be driven out sufficiently to loosen said cross-bar. Then, after the cross-bar 10 is adjusted to a required position, the keys can be driven in to secure said cross-bar in place. The inner end of each clearer is attached to a cross-bar 11, which is connected to adjustable suspenders 12, attached to the framework A in such manner that the cross-bar 11 can be raised or lowered, as occasion may require, and for that purpose the upper end of each of said suspenders 12 is provided with a slotted opening, as indicated in dotted lines in Fig. 1, and a bolt passes through said slotted opening to secure the upper end of the suspender 12 to an adjacent cross-bar of the framework A. The clearers E are curved, so that the teeth of the segmental plates will protrude therefrom at the front of the machine, but the lower part of each clearer has a straight portion that is formed tangentially to the curved portion, so that the teeth of the segmental plates will be automatically drawn in above the lower edge of the clearer, and thereby any jute carried by said teeth will be discharged downwardly therefrom and deposited on a conveyer F, which may be composed of an endless belt, as shown in the drawings, or any other well-known form of conveyer suitable for the purpose.

It is obvious that by making the clearers E adjustable independently of the shaft B and its journal-boxes provision is made for obtaining a greater or lesser projection of the teeth of the segmental plates D at the front of the machine and an earlier or later retraction of said plates at the lower portion of the clearers E.

G is a feeding-table fixed to the front of the machine and preferably arranged on an incline. Said table is designed to hold the bale of jute while the latter is being fed toward the separating mechanism of the machine.

A transverse shaft 32 is journaled to the forward end of the feeding-table G and is provided with pinions 13, which mesh into racks 14, as indicated by dotted lines in Fig. 1. A face-board H is hinged to the inner end of the racks 14, so as to be turned in an erect position, as shown by full lines in Fig. 1, or to be turned down, as indicated by dotted lines in the same figure. Said face-board bears against the bale of jute to force the latter into position where the teeth of the segmental plates D can take in the fibers of the jute to effect the separation of said fibers from the bale. On the outer face of the face-board H an angle-brace 15 is hinged, so as to be turned perpendicularly to the plane of the face-board for the purpose of holding the latter in its erect position or to turn against the face of the face-board to allow the latter to be turned down for the purpose of placing a bale of jute in position on the feeding-table G in contact with the ribs E, so that the teeth of the segmental plates can strike into the jute. On the outer end of the shaft 32 a ratchet-wheel 16 is secured for the purpose of affording means for imparting an intermittent rotatory motion to said shaft. A shaft 17 is arranged at one end of the machine and is provided with a pulley 18, on which a belt 19, leading from a feed-pulley 20, runs to impart motion to the shaft 17. The feed-pulley 20 is secured on the shaft B. The shaft 17 carries an eccentric 21, which is indicated by dotted lines in Fig. 1, and said eccentric is connected by a rod 22 to an arm 23, arranged intermediate the shafts 32 and 17, and the free end of said arm is provided with a slotted opening 24, in which the wrist-pin, to which the rod 22 is connected, can be adjusted, as occasion may require. To the arm 23 a rod 25 is jointed, and to the outer end of said rod is attached a compound pawl, which is composed of a head 26, which is rectangular in form and is provided with oppositely-located knife-edges and has a screw-stem that is fitted to screw into the end of the rod 25, whereby said head is adjustable to bring either of its edges in position to take against the teeth of the ratchet-wheel 16 and to either increase or diminish the distance between it and the joint of the rod 25 to the arm 23. Said head and rod form one part of the compound pawl, the other part consisting of a bifurcated pawl 27, which is jointed to the rod 25 and is provided with a head 28, extending outwardly beyond the head 26, and is provided with a knife-edge that is adapted to take against the teeth of the ratchet-wheel 16. The head 26 should be arranged in relation to the head 28 in such manner that when one of them is in position to engage with a tooth of said ratchet-wheel the other will be positioned about midway between two adjacently-located teeth of said wheel, and by this arrangement provision is made for imparting a partial rotative movement to the ratchet-wheel less than the pitch of its teeth. By adjusting the wrist-pin in the slotted opening 24 the movement of the arm 23 can be increased or diminished, as occasion may require, and thereby the degree of rotative movement of the shaft 12 can be varied to meet any requirement of circumstances.

I is a handle secured to the face-board H for the purpose of turning the latter either up or down, and preferably said handle is arranged to stand at an outwardly-inclined angle to the plane of the face-board in such manner that when the latter is turned down said handle can be utilized as a skid on which a bale of jute can be moved preparatory to its being deposited on the feeding-table G, so that it will lie between said face-board and the clearers E. Instead of a single handle I, as shown in the drawings, the face-board H can have several like handles arranged to operate as skids.

My invention is operated in the following manner: While the face-board H is turned down at the outer extremity of its movement a bale of jute is rolled up over said face-board and its handle and deposited on the feeding-table G, so as to lie between the face-board and the clearers E and so as to bear against the latter, after which the face-board H should be turned up into its perpendicular position and locked by the angle-brace 15. The shaft B is then set in motion and causes the bale to be fed inward by the feeding mechanism operated by said shaft, and by the rotations of the shaft B the arms C will successively be carried to the front of the machine to protrude the series of segmental plates D, attached to each arm, beyond the clearers, so that their teeth will strike against the side of the bale and thereby loosen and break out the fibers of the jute from the bale, and said fibers will be carried by said teeth toward the bottom of the machine until said fibers are automatically removed from the teeth by the clearers D. The fibers dropping from the teeth fall upon the conveyer F and are carried by the latter to any place provided for the purpose of receiving them preparatory to their being made into fabrics or other articles for which such material is used.

What I claim as my invention, and desire to secure by Letters Patent, is—

1. The combination, with a shaft, B, having a series of arms, C, arranged helically thereon; each of said arms being provided with a series of segmental plates, D, whose outer edges are serrated, a clearer or clearers, E, having an upper curved portion and a straight lower portion that is tangential to said curved portion; said clearers being arranged in such relation to the shaft B that the teeth of said serrated plates will protrude beyond said curved portion and be retracted at the straight portion of said clearers, of a feeding mechanism—substantially as described— whereby a bale of compacted material will be fed forward to the action of the teeth of the serrated plates, as and for the purpose specified.

2. The combination of a shaft, B, a series of arms, C, secured to and arranged helically around said shaft, a series of serrated segmental plates, D, attached to the outer end of each of said arms, and a series of clearers, E, having an upper curved portion and a lower straight portion that is tangential to the curved portion; said clearers being adjustable with relation to the shaft B, as and for the purpose specified.

3. The combination of a shaft, B, provided with arms, C, having a series of serrated segmental plates, D, at their outer end, an intermediate shaft, 17, driven by the shaft B and having an eccentric, 21, connected to a rod, 25, provided with a longitudinally-adjustable head, 26, a shaft, 32, provided with a ratchet-wheel, 16—with which the head 26 intermittently engages—and having pinions, 13, secured thereon, racks, 14, which gear into said pinions, a face-board, H, hinged to said racks, and a feeding-table, G, on which said face-board is arranged to move, as and for the purpose specified.

4. The combination of a shaft, 17, an eccentric, 21, secured to said shaft, a rod, 25, moved by said eccentric and provided with a longitudinally-adjustable head, 26, and with a pawl, 27, that is hinged to said rod, and a ratchet-wheel, 16, with which said head and pawl are fitted to engage, as and for the purpose specified.

5. The combination of a shaft, B, a series of serrated plates, D, carried by and helically arranged around said shaft; the teeth of said plates having inclined edges at their foremost part, a series of clearers, E, arranged to remove the fibrous material from said serrated plates, and a conveyer, F, consisting of an endless belt that is arranged under said clearers and is adapted to convey the fibrous material away from the machine, as and for the purpose specified.

ROBERT C. MENZIES.

Witnesses:
H. PRIOR KING,
CASS. C. LAPOINT.